No. 704,897. Patented July 15, 1902.
E. F. MAY.
HARROW.
(Application filed Feb. 7, 1901.)
(No Model.)
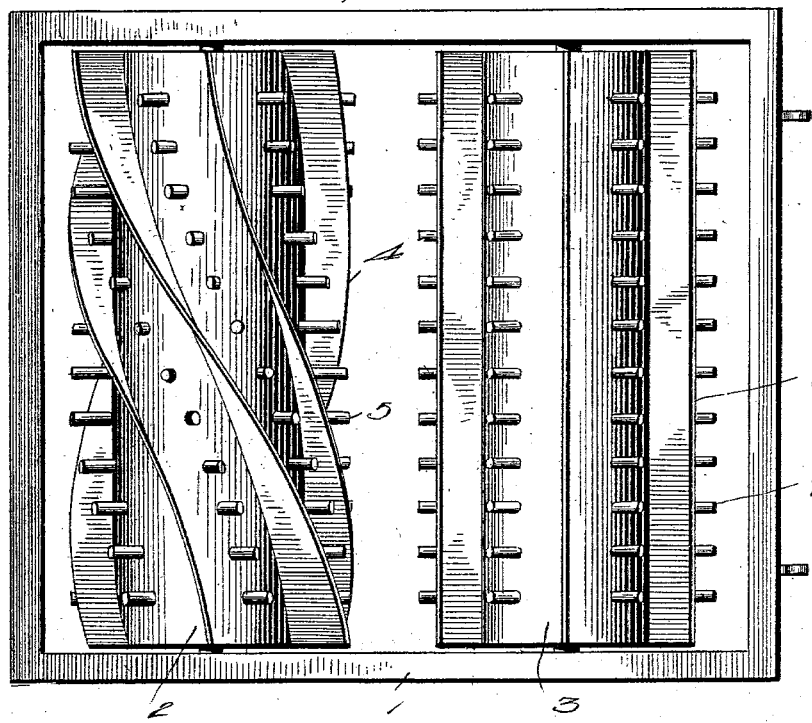
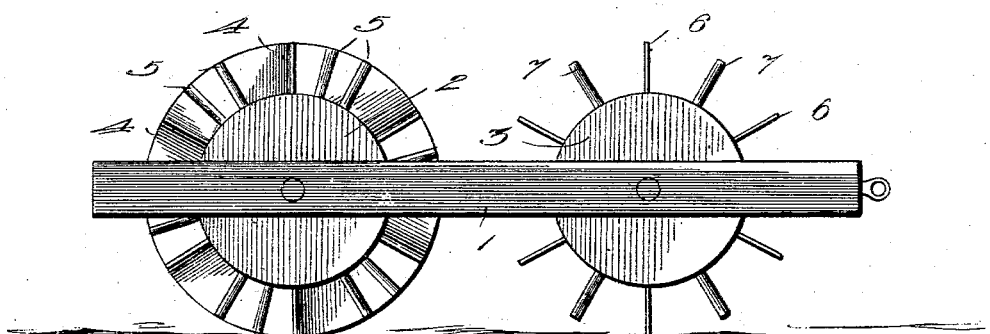
Inventor
E. F. May
By Victor J. Evans.
Attorney
Witnesses

UNITED STATES PATENT OFFICE.

EDGAR F. MAY, OF WAUKOMIS, OKLAHOMA TERRITORY.

HARROW.

SPECIFICATION forming part of Letters Patent No. 704,897, dated July 15, 1902.

Application filed February 7, 1901. Serial No. 46,422. (No model.)

*To all whom it may concern:*

Be it known that I, EDGAR F. MAY, a citizen of the United States, residing at Waukomis, in the county of Garfield and Territory of Oklahoma, have invented new and useful Improvements in a Combined Roller, Cutter, and Harrow, of which the following is a specification.

This invention relates to new and useful improvements in a combined roller, cutter, and harrow; and its primary object is to provide a device of light, simple, and durable construction which is easily operated and is effective in use.

A further object is to so construct the device as to render the same especially adapted for use in dry weather.

Another object is to employ means whereby the soil is slightly turned while being rolled, cut, and harrowed when the device is used.

With these and other objects in view the invention consists in the novel construction and combination of parts hereinafter more fully described and claimed, and illustrated in the accompanying drawings, showing the form of my invention, and in which—

Figure 1 is a plan view of my improved combined roller, cutter, and harrow. Fig. 2 is an elevation of the same.

1 is a rectangular frame, within which are mounted two rollers 2 and 3, respectively, having continuous rolling-surfaces and arranged one in rear of the other. The rear roller 2 is provided with parallel spiral radial blades 4, extending from end to end thereof at regular intervals, and alternating therewith between the blades are spiral rows of radial pins or studs 5. The front roller 3 is provided at regular intervals with longitudinally-extending parallel straight radial blades 6, and located between these blades are rows of radial pins or studs 7.

As the first combined roller, cutter, and harrow travels over the soil to be pulverized the roller is supported on the surface of the ground, while the radial blades 6 cut thereinto and break all clods with which they come in contact. The radial pins or studs 7 at the same time are forced into the earth and throw the same upward. The second or rear combined roller, cutter, and harrow operates in a somewhat similar manner to continue the work of the first combined roller, cutter, and harrow by following in the wake thereof. The spiral radial blades 4, however, serve not only to cut the soil, but also to partly turn the same in addition thereto.

Having thus fully described my invention, what I claim as new, and desire to secure by Letters Patent, is—

A harrow comprising a carrying-frame, a front roller journaled in the frame and having a continuous rolling-surface, straight radial cutting-blades extending the length of the roller with spaces between them, straight rows of radial teeth disposed at intervals the length of the roller and between the cutting-blades, a rear roller journaled in the frame and having a continuous rolling-surface, cutting-blades spirally disposed on the face of the roller and extending longitudinally of the length thereof, and spirally-arranged rows of radially-extending teeth intermediate of the spirally-arranged cutting-blades.

In testimony whereof I affix my signature in presence of two witnesses.

EDGAR F. MAY.

Witnesses:
M. S. NEWCOMB,
BERT CAMPBELL.